US 6,644,856 B2

(12) United States Patent
Lasch

(10) Patent No.: US 6,644,856 B2
(45) Date of Patent: Nov. 11, 2003

(54) HYDROSTATIC BEARING DEVICE

(75) Inventor: Thorsten Lasch, Aspach (DE)

(73) Assignee: Deckel Maho Seeback GmbH (DE)

( * ) Notice: Subject to any disclaimer, the term of this patent is extended or adjusted under 35 U.S.C. 154(b) by 53 days.

(21) Appl. No.: 09/835,485

(22) Filed: Apr. 16, 2001

(65) Prior Publication Data

US 2001/0021284 A1 Sep. 13, 2001

Related U.S. Application Data

(63) Continuation of application No. PCT/EP00/01677, filed on Feb. 29, 2000.

(30) Foreign Application Priority Data

Apr. 17, 1999 (DE) .......................................... 199 17 516

(51) Int. Cl.[7] .............................................. F16C 32/06
(52) U.S. Cl. ........................................ 384/12; 384/100
(58) Field of Search ............................ 384/12, 15, 16, 384/100, 119, 124

(56) References Cited

U.S. PATENT DOCUMENTS

| | | | | |
|---|---|---|---|---|
| 3,499,690 A | * | 3/1970 | Seibers ........................ 384/12 |
| 3,610,365 A | * | 10/1971 | Maddox et al. ................ 384/12 |
| 4,114,959 A | * | 9/1978 | Christ .......................... 384/12 |
| 4,404,724 A | * | 9/1983 | Christ et al. ................. 384/119 |
| 4,540,221 A | * | 9/1985 | Frazer .......................... 384/12 |
| 4,634,297 A | * | 1/1987 | Schriwer ..................... 384/100 |
| 4,753,311 A | | 6/1988 | Berger et al. ................ 180/125 |
| 6,033,116 A | * | 3/2000 | Pflager et al. ................. 384/12 |

FOREIGN PATENT DOCUMENTS

| | | |
|---|---|---|
| DE | 3012732 | 1/1981 |
| DE | 3202188 | 8/1983 |
| DE | 333916 | 5/1985 |
| FR | 2318001 | 11/1977 |
| FR | 2606473 | 5/1988 |

\* cited by examiner

*Primary Examiner*—Thomas R. Hannon
(74) *Attorney, Agent, or Firm*—Bourque & Associates, P.A.

(57) ABSTRACT

A hydrostatic bearing device for two machine areas moving relative to each other and having faces parallel to each other with a fluid space delimited by parts of the two different machine areas and forming a gap. The fluid is under pressure in the fluid space. The gap between the two machine areas is blocked by means of a seal having a tapered end against one machine area and wherein the pressure reservoir maintains the fluid under pressure in the fluid space.

7 Claims, 2 Drawing Sheets

HYDROSTATIC BEARING DEVICE

CROSS-REFERENCE TO RELATED APPLICATIONS

This is a continuation of international application PCT/EP00/01677, filed Feb. 29, 2000, which designated the United States and is now abandoned.

TECHNICAL FIELD

The invention concerns a hydrostatic bearing device and in particular, to a seal which is tapered and in contact with a facing sliding surface of another machine area with an extremely small contact area.

BACKGROUND INFORMATION

In a generally known hydrostatic bearing device according to the description of the patent claim 1 (U.S. Pat. No. 4,753,311), the fluid chamber is constantly topped off through a supply and the leakage quantity is carried off outside of a seal enclosing the fluid space. The existing solution allows only comparatively low feed velocities. If the feed velocities are higher, the large seal surface facing an opposing sliding surface develops a hydrodynamic gap and causes high leakage volume. The consequence of the high leakage volumes is that the existing bearing device has to be constantly fed with hydraulic fluid from a pressure source, usually by means of a high-pressure pump. It is therefore necessary to feed each fluid space of every pressure chamber of the possible several through a hydraulically separate supply line. Collecting the hydraulic fluid flowing out of the fluid space is also expensive.

SUMMARY OF THE INVENTION

The invention overcomes these difficulties by providing a hydrostatic bearing device with a simple construction, cost-effective manufacture and lower operating costs and which does not have the above-mentioned disadvantages of the already known hydrostatic bearing devices.

More particularly, the present invention provides a seal which is tapered and therefore is in contact with the facing sliding surface of the other machine area with an extremely small contact area, which is contoured similar to the cut. The tapering contour shape allows considerably higher feed velocities than the existing solutions. It also reduces the leakage quantity between seal and the sliding surface to such an extent that it is possible to dispense with the constant hydraulic fluid supply so indispensable with the state of the art technology. It is enough to provide only a pressure reservoir, absent in the current state of the art, in order to maintain pressure in the fluid space.

The design of the seal according to the present invention makes it possible to lengthen the interval for topping off the pressure chamber to the point that the topping off process has no adverse effect on the usability of the bearing device. The bearing device design can be compact having small dimensions, so that it can be used even in small spaces.

BRIEF DESCRIPTION OF THE DRAWINGS

A preferred version of the invention has been described below with the help of drawings wherein.

DETAILED DESCRIPTION OF THE PREFERRED EMBODIMENTS

Figure 1:
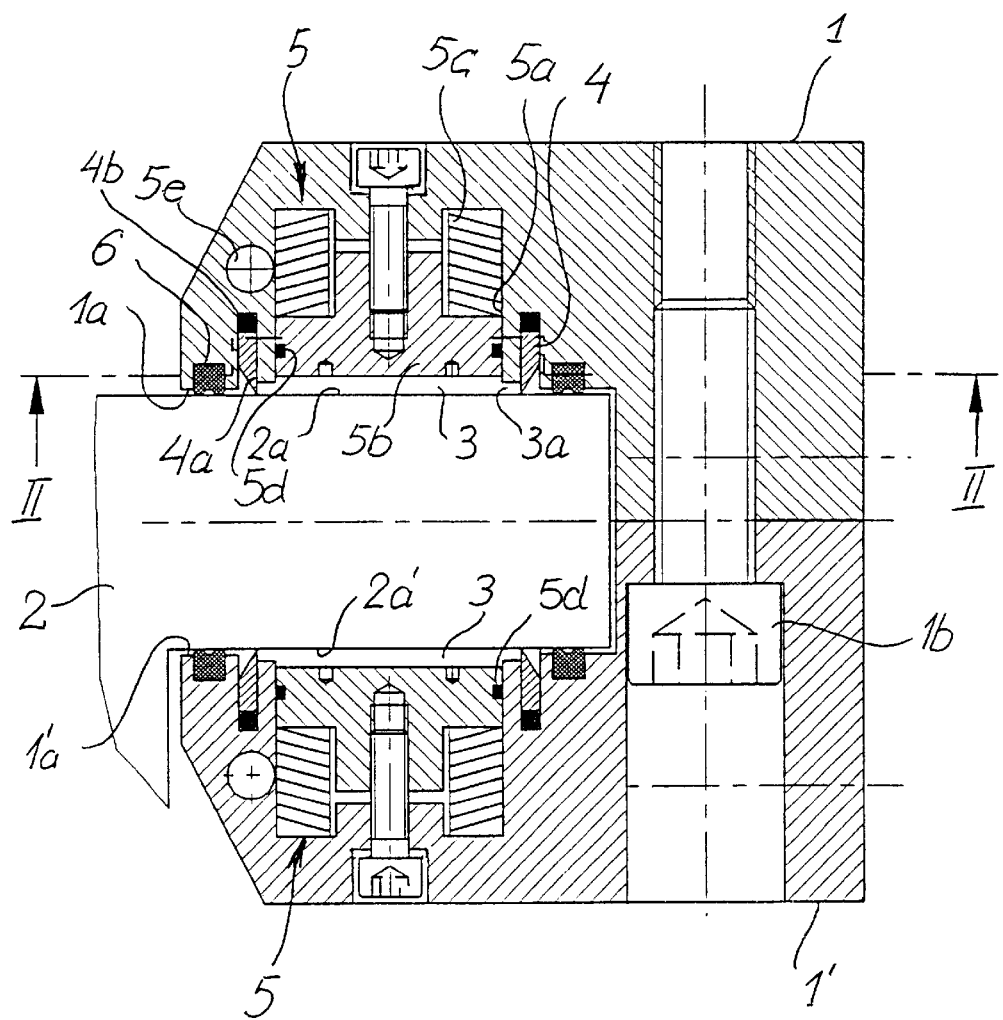
FIG. 1 is a cross-section through two hydrostatic bearing devices opposed to each other.

FIG. 1 shows two hydrostatic bearing devices opposite each other with respect to their effect, arranged in two initial machine areas 1 and 1'. They are combined into one guide shoe by means of screws 1b. The guide shoe holds on to a second machine area 2 designed as a guide strip. The guide strip can have a fixed position on a machine chassis, while the guide shoe can slide on the guide strip perpendicular to the plane of the drawing.

Gap 3a exists between the machine area 1 and 1' and the machine area 2. The gap 3a is delimited by the faces 1a and 2a, 2a' and 1a' respectively.

The gaps 3a prevent any contact of the machine areas 1 and 1' with the machine area 2. A pressure reservoir 5 each is located in the machine areas 1 and 1', which keeps the fluid in a fluid space 3 under pressure. The fluid space 3 is delimited by 2 circular seals 4.

The pressure reservoir 5 has a piston 5b. This piston is inserted into and slides within a cylinder chamber 5a and is sealed against this cylinder wall by means of a piston ring 5d. The piston 5b has a pressure spring 5c which generates the fluid pressure. The pressure reservoir 5 maintains the fluid pressure in the fluid space 3, even if there are minor fluid losses over a sufficiently long period. The fluid space 3 can be blocked through connection with fluid feeding line 5e, through which the leakage fluid can be replaced.

The ring seal 4 is placed in a ring-shaped slit in the machine area 1 or 1' and supported on a flexible element 4b on the bottom of the slit. Seal 4 is typically fabricated from a hard metal or ceramic material, although equivalent materials may be utilized. The side of the one seal 4 facing the machine area 2 has the same shape as the facing surface of the other seal 4. It forms the contact area 4a with the surfaces 2a or 2a' of the second machine area 2. Due to the contour or taper of the contact area 4a, a low loading pressure suffices for sealing the gap 3a. There is no adverse effect on the hydrostatic efficiency of the bearing due to the small contact surface and the low contact pressure.

Figure 2:
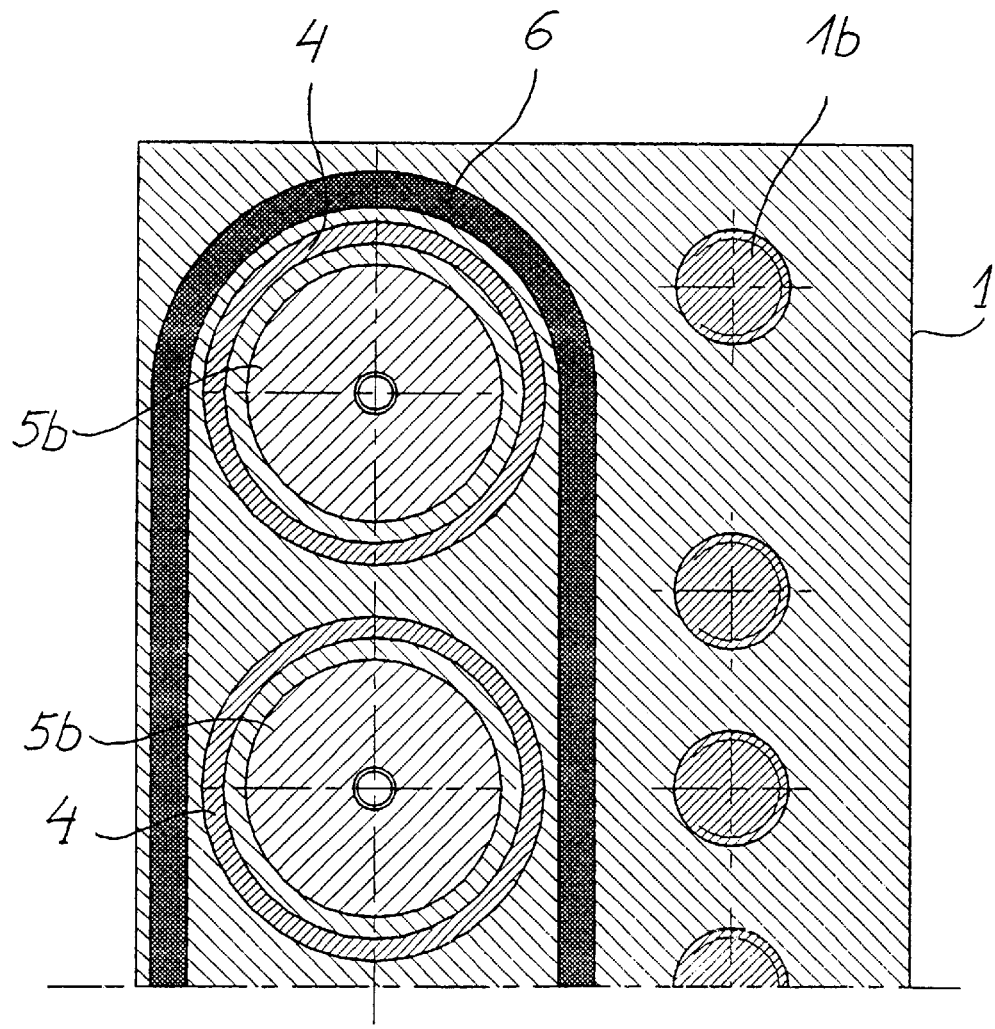
FIG. 2 is a cross-section through the bearing device corresponding to the section line II—II in FIG. 1.

A long version contains several bearing devices arranged one behind the other in the feed direction, as FIG. 2 shows. All the fluid spaces 3 delimited by the seals 4 between the faces 1a and 2a or the faces 1a' and 2a' are surrounded by a common additional seal 6, which helps prevent impurities from penetrating the gap 3a and damaging the seal contact areas 4a, seal 6 is typically fabricated from an elastomeric or resilient material such a plastic, nylon, rubber or the like.

Modification and substitutions by one of ordinary skill in the art is considered to be within the scope of the present invention which is not to be limited except by the claims which follow.

The invention claimed is:

1. A hydrostatic bearing device for first and second machine areas moveable relative to each other and having faces parallel to each other and having a fluid chamber defined by parts of the two different machine areas which form a gap, wherein fluid in the fluid chamber and the gap between the two machine areas is blocked by means of at least one seal, the bearing device comprising:

at least one seal disposed in the first machine area and having a tapered contact area in contact the second machine area; and a fluid pressure reservoir in fluid communication with said gap, said fluid pressure reservoir having a pre-pressurized piston adapted to slide in a cylinder chamber, wherein said pre-pressurized piston biases against said fluid in said gap to generate and maintain the pressure in the gap.

2. A hydrostatic bearing device as per claim 1 characterized in that the at least one seal is pre-tensioned for urging the at least one seal in a direction of the tapered contact area.

3. A hydrostatic bearing device as per claim 2 characterized in that the fluid chamber is circular.

4. A hydrostatic bearing device as per claim 1 characterized in that the at least one seal is in the shape of a round ring.

5. A hydrostatic bearing device as per claim 1 further including an additional seal element provided outside the gap blocked by the at least one seal.

6. A hydrostatic bearing device as per claim 1, characterized in that the pre-pressurized piston is pre-pressurized by means of a at least one pressure spring.

7. A hydrostatic bearing device as per claim 1 further including a fluid feed line coupled to the fluid chamber.

* * * * *